United States Patent [19]

Moulin

[11] Patent Number: 4,595,251
[45] Date of Patent: Jun. 17, 1986

[54] COUPLING MECHANISM FOR CONNECTORS

[75] Inventor: Norbert L. Moulin, Placentia, Calif.

[73] Assignee: Hughes Aircraft Company, Culver City, Calif.

[21] Appl. No.: 697,368

[22] Filed: Feb. 1, 1985

[51] Int. Cl.⁴ .............................................. H01R 25/00
[52] U.S. Cl. ................................... 339/47 R; 339/48;
 339/89 C; 339/91 R; 339/65; 339/186 R;
 339/177 R
[58] Field of Search .................... 339/47-49,
 339/88, 89, 90, 255 R, 258 T, DIG. 2, 177 R,
 177 E

[56] References Cited

U.S. PATENT DOCUMENTS

| | | | |
|---|---|---|---|
| 1,159,567 | 11/1915 | Burton | 339/47 R |
| 2,690,542 | 9/1954 | Pearce et al. | 339/89 R |
| 3,129,993 | 4/1964 | Ross | 339/49 R |
| 3,685,004 | 8/1972 | Kerr | 339/61 M |
| 3,855,566 | 12/1974 | Richardson | 339/49 R |
| 4,037,902 | 7/1977 | Miller | 339/49 R |
| 4,525,017 | 6/1985 | Schildkraut et al. | 339/DIG. 2 |

FOREIGN PATENT DOCUMENTS

| | | | |
|---|---|---|---|
| 943983 | 10/1948 | France | 339/47 R |
| 2040113 | 7/1980 | United Kingdom | 339/63 M |

Primary Examiner—Joseph H. McGlynn
Assistant Examiner—David L. Pirlot
Attorney, Agent, or Firm—Joseph E. Szabo; Anthony W. Karambelas

[57] ABSTRACT

A connector 13 is provided with a rotationally spring-loaded coupling ring 21 having a set of thread segments 139 distributed around its front end. A pair of identical such connectors 13 may be quickly interlocked by pressing the connectors together and twisting their coupling rings in mutually opposite directions.

Also disclosed is an alignment tube segment 47 which when interfitted with its identical counterpart forms an alignment tube for precisely maintaining a pair of contact bushings 111 on a single axis. A tool 211 designed to install such an alignment tube segment into the disclosed connector is also disclosed.

59 Claims, 30 Drawing Figures

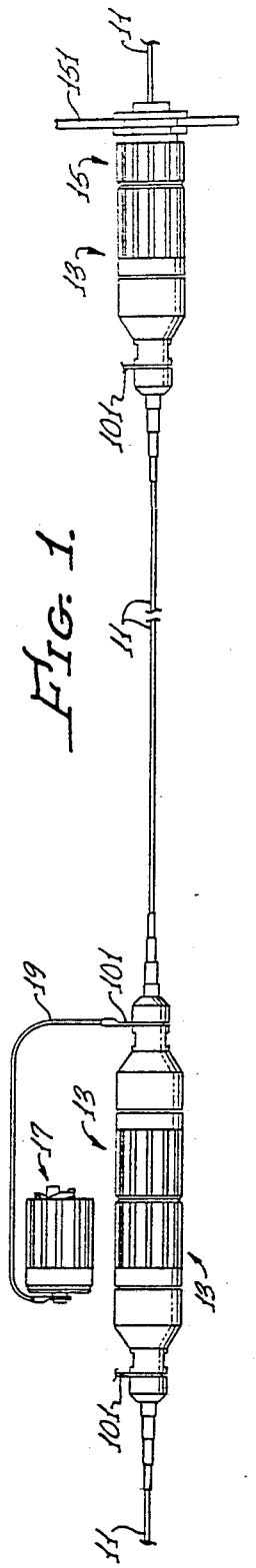
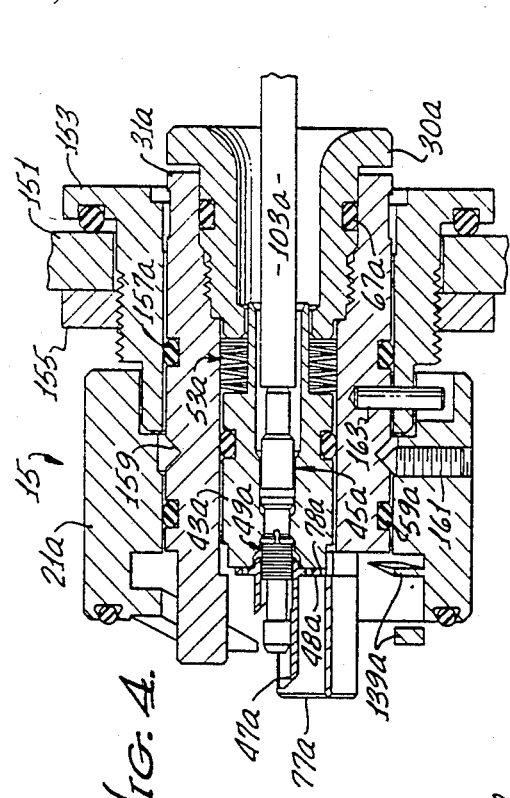
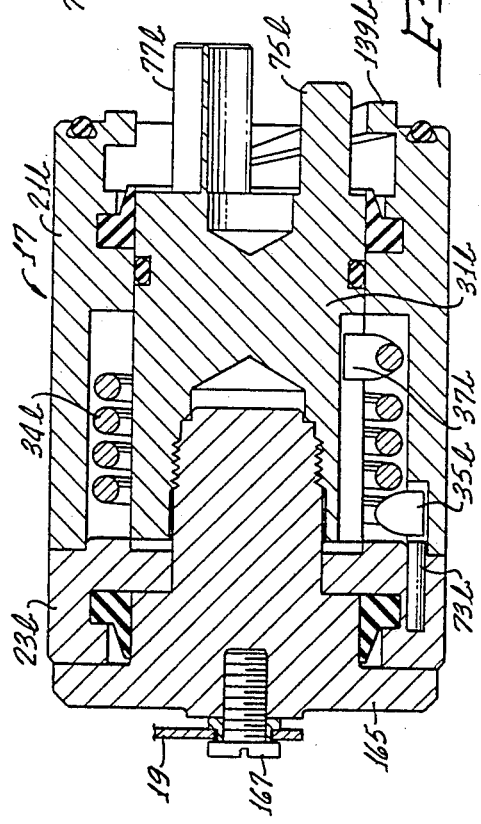

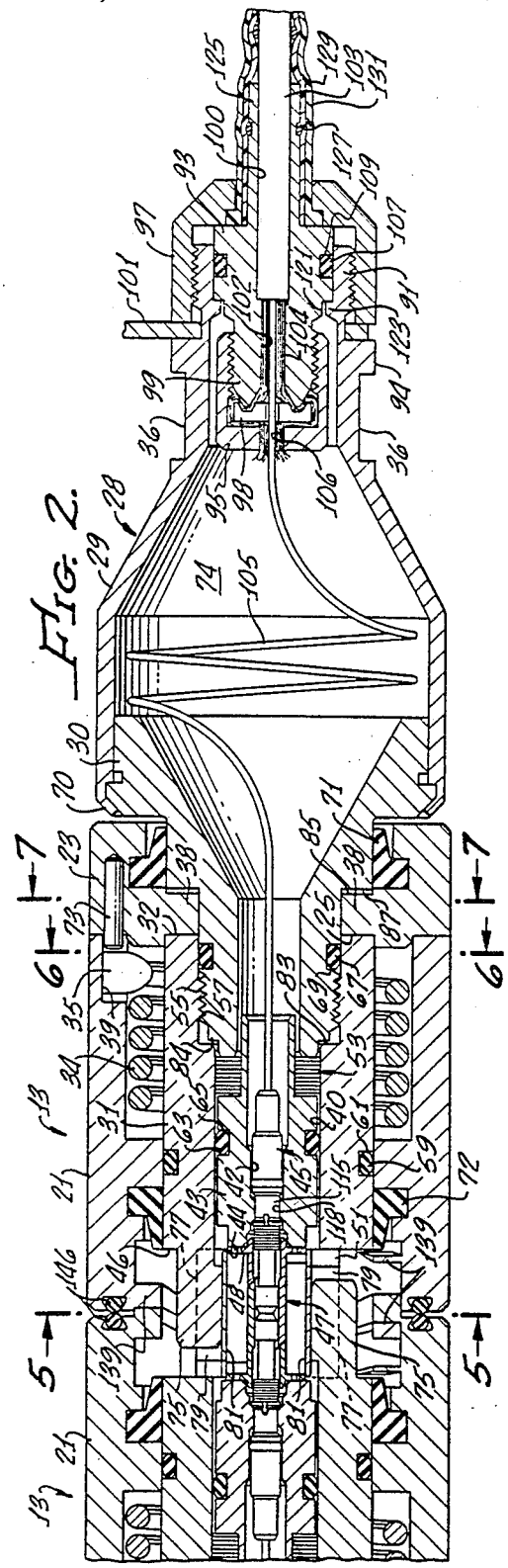

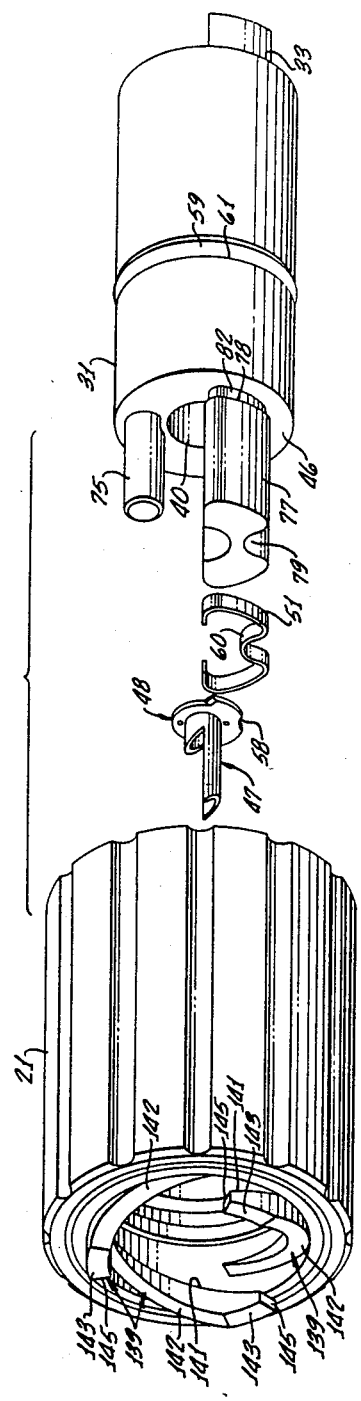
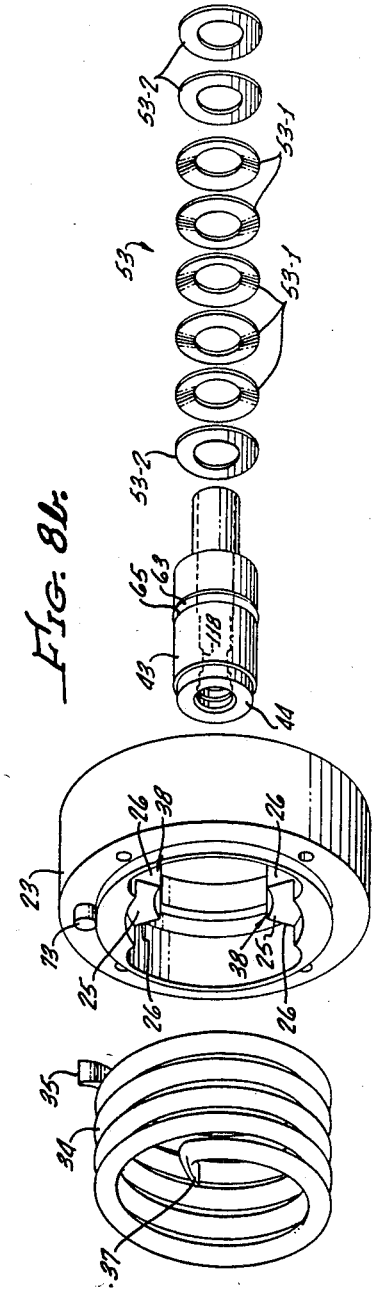
Fig. 8a.
Fig. 8b.

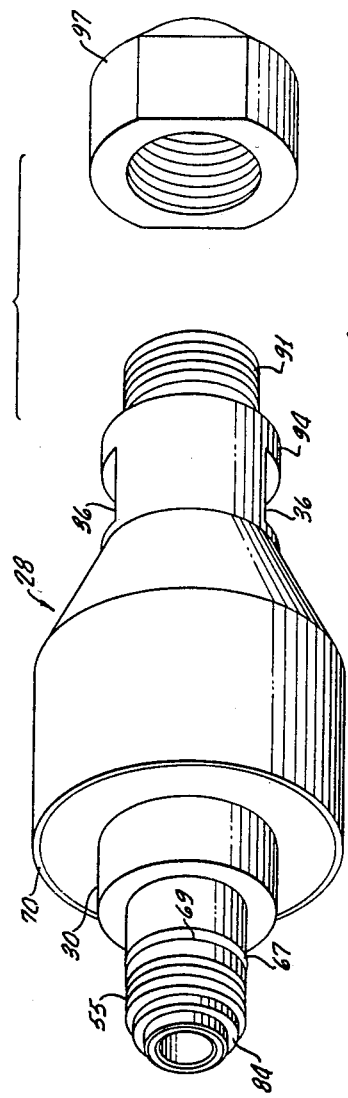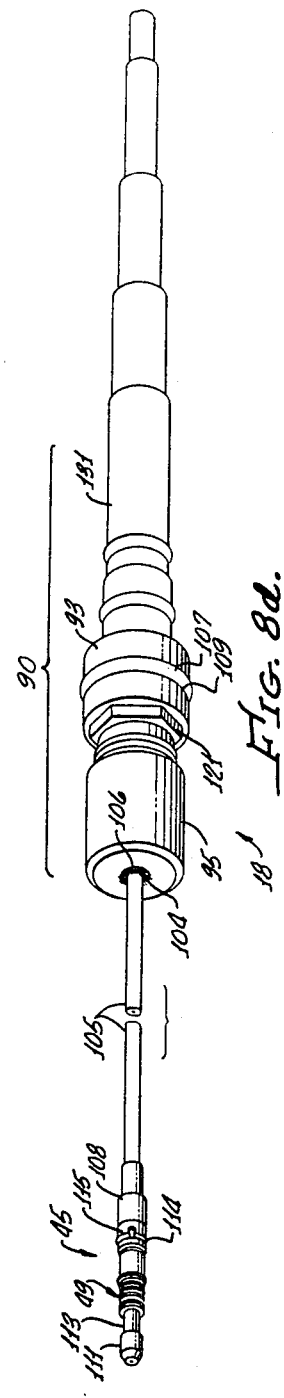

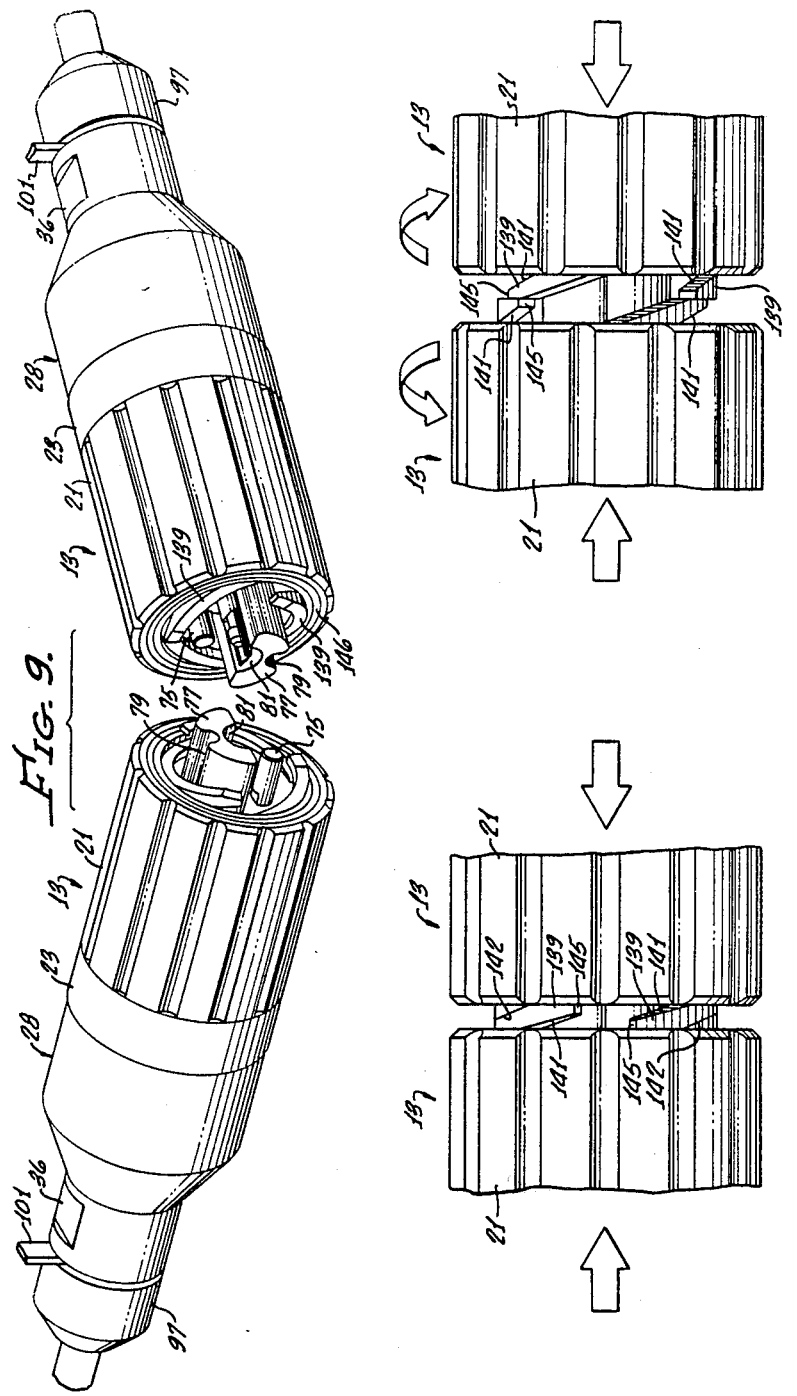

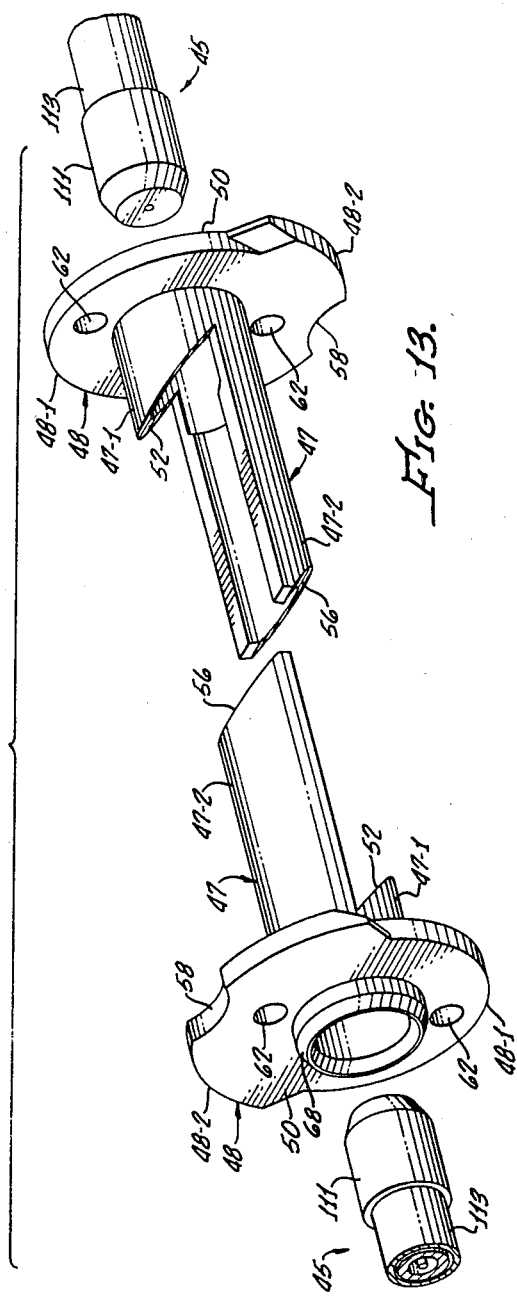
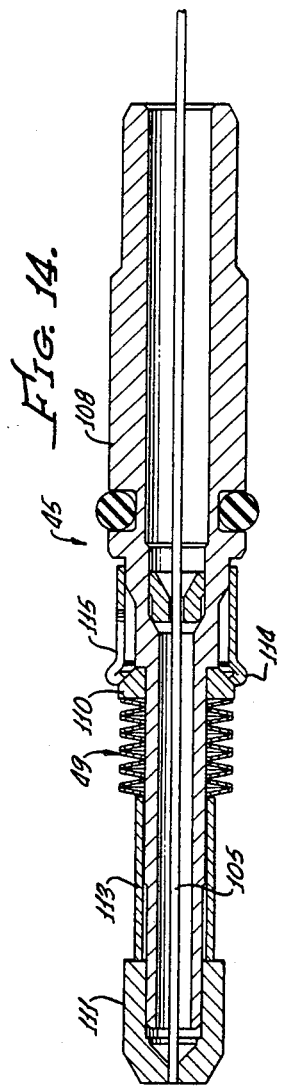

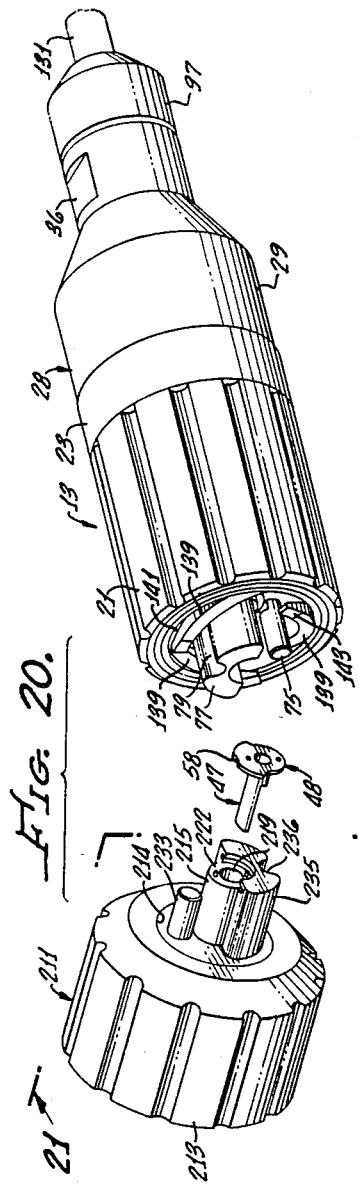
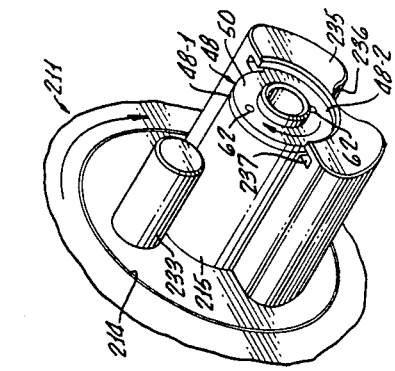
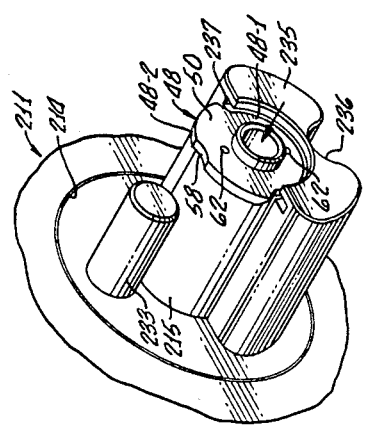
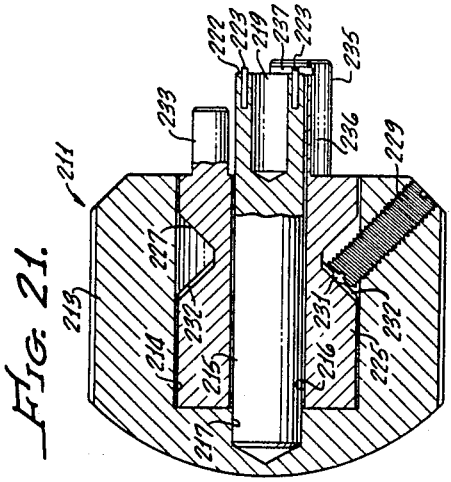

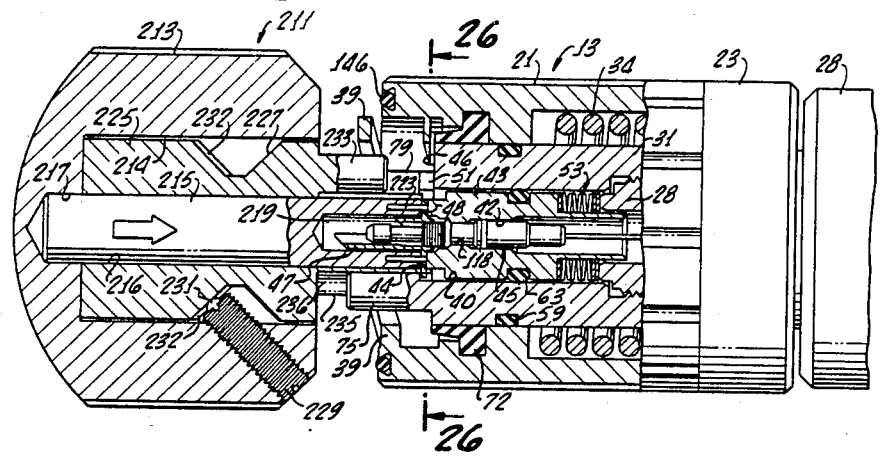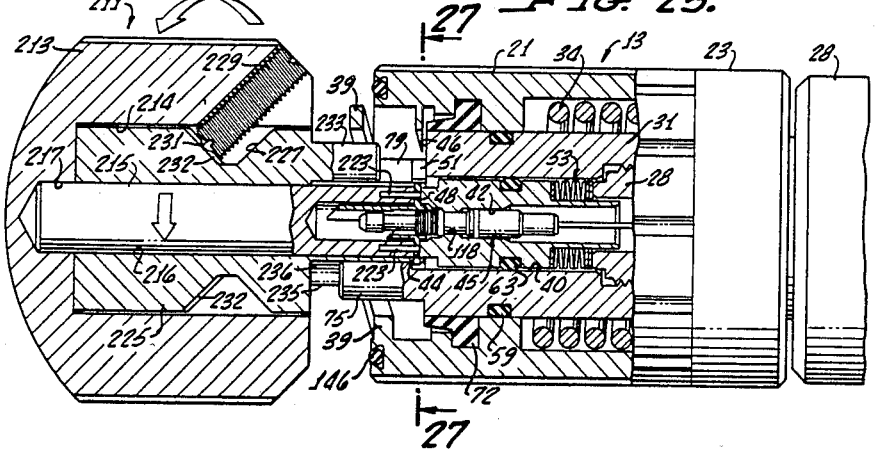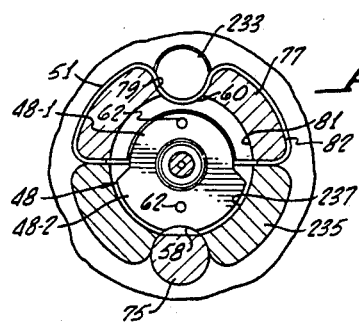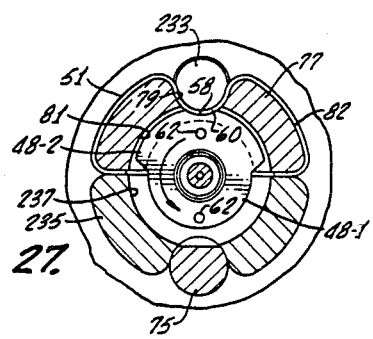

COUPLING MECHANISM FOR CONNECTORS

CROSS-REFERENCES TO RELATED APPLICATIONS

This patent application is related to U.S. Pat. No. 4,558,501, issued Dec. 17, 1985, by Norbert L. Moulin and James T. Hartley, entitled "Contact Alignment Tube Insertion/Removal Tool," assigned to the assignee of the present application.

BACKGROUND OF THE INVENTION

1. Field of the Invention

This invention is related to coupling mechanisms in general and more particularly to coupling mechanisms intended for use with connectors, most particularly with fiber optic connectors.

2. Description of Related Art

Connectors of the type to which the present invention pertains are typically used to connect links of a cable in series to form a composite cable assembly which is longer than that which could be conveniently handled if it were made of a single continuous cable. In these and other applications of connectors, it is of paramount importance that their interconnection be easily effected and yet secure. These requirements have not always been met by currently available connectors due to the shortcoming of their coupling mechanisms. One widely-used coupling mechanism for connectors is of the screw and nut type found most frequently on military connectors, both electrical and fiber optic. The coupling mechanism comprises a coupling ring having an internal thread and the mating connector's shell having an external thread. The only locking mechanisms provided are holes through which a locking wire may be threaded. The use of a locking wire has several disadvantages. It may not always be attached and, once the connector is unmated, it may not be replaced. Moreover, the locking wire is inconvenient to apply. It requires a suitable tool to cut and remove the wire, after which the coupling ring must be turned through several rotations in order to unmate the connector. Similarly, mating of the connector requires several rotations and tools are needed to apply the locking wire to complete the mating process.

A second type of widely-used coupling mechanism is that found on the bayonet coupling type of connector. It consists of a coupling ring having an internal cam track in a configuration that provides an inclined plane and a locking contour. The coupling ring mates with bayonet pins attached to the shell of the mating connector. During mating the bayonet pins ride in the cam track. As the coupling ring is rotated, the bayonet pins guide the connector to its mated condition. In the final stages of the mating sequence, a wave spring washer is compressed and the bayonet pins drop into a locking recess in the cam track of the coupling ring.

The bayonet coupling type connector is easier to unmate and to remate than is the screw and nut type. Typically, to disengage the connector from its counterpart the coupling ring simply needs to be rotated approximately 100° counterclockwise rather than through several turns. Engagement is also relatively quick, requiring rotation of only about 100° clockwise to engage and making sure that full engagement occurs by listening for an audible click as the bayonet pins drop into their locking position. The need for a locking wire, thus, is obviated. Notwithstanding these advantages of the bayonet coupling type connector, it has several serious disadvantages. Among them is the wear caused by the high pressure between the bayonet pins and the cam track in which they ride. Moreover, since the connectors are held in their mated condition by the force supplied by the wave washer, they can be inadvertently disconnected, since cable tension can overcome the force generated by the wave washer. Finally, the rotary torque that has to be exerted upon the coupling ring to overcome the locking position in the course of disengaging the connectors can be quite high.

Accordingly, it is a general object of the present invention to provide an improved coupling mechanism, primarily for connectors, which is self locking and which is secure from disengagement due to vibration and shock.

It is a related object of the present invention to provide a quickly attachable and detachable connector capable of mating with an identical counterpart, and which is held in secure contact therewith.

Another object of the present invention is to provide an optical connector which will securely seal its contacts while mating them with precise force, and which is capable of engaging its identical counterpart.

Other objects and advantages of the invention will become apparent as this description proceeds.

In fiber optic connectors it is very important that the contact elements in a pair of mating connectors be accurately aligned with respect to each other along their mutual axes, or, in other words, that they be precisely coaxial. Otherwise, their respective optic fibers will be imperfectly aligned so that part of the light emanating from the tip of one fiber will fail to enter the tip of the other fiber. A common expedient for insuring precise alignment of fiber optic contacts is to use an alignment tube into which the tips of both fiber optic contact assemblies enter. It is apparent that an entire alignment tube for a particular contact pair cannot be located on both connectors; that it has to be carried either on one connector or the other. Consequently, a conventional alignment tube cannot be used on a single contact hermaphroditic connector.

Accordingly, it is another principal object of the present invention to provide alignment tube segments for a connector, and particularly for a fiber optic connector, which are axially interfitting and mutually complementary so that when they are interfitted they will constitute an alignment tube having a single longitudinal axis.

It is a related object of the present invention to provide a pair of axially-interfitting, mutually-complementary alignment tube segments which when interfitted constitute an alignment tube having a single longitudinal axis for precisely aligning a pair of cylindrical tips, which may be bushings, carried by a pair of contact assemblies. Moreover, it is an additional object of the invention so to configure the interfitting alignment tube segments that in the process of interfitting they conform to the contours of the bushings held within them, thereby forcing the bushings into precise axial alignment.

SUMMARY OF THE INVENTION

Meeting the above and other objects, the present invention in its basic form is a coupling mechanism comprising a cylindrical core on which a coupling ring is rotatably mounted. Means between the coupling ring and the core resiliently bias the coupling ring against rotation relative to the core and keying means on the core extend axially beyond the front end of the coupling ring. A plurality of staggered thread segments at the front end of the coupling ring are distributed symmetrically about its periphery. The coupling mechanism is capable of securely interlocking in a simple manner with another coupling mechanism which may be identical thereto. Two such coupling mechanisms can be quickly interlocked by pushing them together front to front so that their keying means engage one another. Twisting the coupling ring of each relative to its core causes the respective thread segments of the coupling rings at first to ride on one another and then to snap into engagement, after which the coupling rings may be released so that they may be powered to turn clockwise under the influence of their built-in biasing devices.

The coupling mechanism just described is also capable of interlocking with another mechanism which is not identical therewith, so long as it includes keying means and staggered thread segments to engage the corresponding keying means and thread segments of the coupling mechanism.

In accordance with another feature of the present invention, the coupling mechanism is incorporated in a connector which may or may not be hermaphroditic. In keeping with this feature of the invention, one or more contacts are mounted on the front end of the core and, advantageously, the keying means may be so configured that they extend substantially 180° around the contact so that when a pair of such connectors are mated, their respective keying means form a cylindrical shroud fully surrounding their respective contacts.

Particularly where fiber optic connectors are involved, it is very important that their contacts be pressed together with a predetermined force. It may also be necessary that additional aligning devices on the respective connectors intermate with a force which is higher than that with which the contacts themselves are pressed together. It is a particular advantage of the present invention that provision may be made to insure that a predetermined force presses the pins together and that a second and greater predetermined force presses together their associated aligning devices. Instrumental in providing this axial force is the biasing means of the coupling mechanism whose torque is translated into an axially-oriented linear force pressing the cores of a pair of interlocked connectors toward one another. For this purpose, both the fiber optic contact and the aligning devices may be spring biased relative to the core of the connector so that the spring constant of the biasing means associated with the contact is smaller than that of the biasing means associated with the aligning device, with both of them having a spring constant such that each of them is at least partially compressed under the urging of the coupling mechanisms' biasing means when the connector is engaged with its identical counterpart.

In accordance with yet another feature of the present invention, a contact alignment system is provided which includes a pair of axially-interfitting, mutually-complementary aligning devices in the form of alignment tube segments which when interfitted constitute an alignment tube having a single longitudinal axis, each segment including a pair of axially spaced-apart end walls at which the segments abut when they are interfitted. The interfitting alignment tube segments are associated with a pair of contact assemblies, each having a cylindrical alignment member, typically a bushing, slideably mounted within and approximately coaxially with a respective one of the tube segments. The tube segments, upon being axially interfitted, force the bushings to move into mutual axial alignment along the longitudinal axis of the alignment tube. It is a further feature of this aspect of the invention that the tube segments are resilient and terminate in a tip portion which is semi-cylindrical in cross section. Furthermore, each bushing has an external diameter which is slightly larger than the internal diameter of its associated tube segment so that upon the tube segments being axially interfitted, their tip portions deflect radially and conform to the contours of their respective bushings. Specifically, the contact alignment system is characterized further in that the end walls of the tube segments are slanted relative to the longitudinal axis of the alignment tube formed by the tube segments so that when the tube segments are pressed together their abutting slanted end walls slide upon one another, thereby bringing the tube segments into axial alignment.

BRIEF DESCRIPTION OF THE DRAWINGS

The invention will be best understood by reference to the accompanying drawings in which:

FIG. 1 illustrates a cable link terminated at each end in a connector incorporating the coupling mechanism of the present invention, one of those connectors being mated to the connector of an adjacent cable link, the other connector being mated to a wall-mounted receptacle. Also shown attached to one of the connectors is a dust cap assembly which may be fastened to the connector when it is not attached to anything else.

FIG. 2 is a cross-sectional view through one of the connectors illustrated in FIG. 1 shown engaged and interlocked with its identical counterpart.

FIG. 3 is a cross-sectional view through the dust cap shown in FIG. 1.

FIG. 4 is a cross-sectional view through the receptacle illustrated in FIG. 1.

FIG. 8a is an exploded perspective view illustrating the relative orientations of the coupling ring, the core which is rotatably mounted within it, and a guide tube section which is slideably mounted on an insert which is spring loaded within the core.

FIG. 8b is an exploded perspective view of the helical spring housed between the coupling ring and the core, and the rear cap which serves to retain the core within the coupling ring, and further showing the insert and the series of springs used to spring load it within the core.

FIG. 8c is an exploded perspective view showing a barrel-shaped portion of the connector which is affixed to the rear of the core thereof.

FIG. 8d is a perspective view of the cable and contact assembly which is installed in the connector of the present invention.

FIG. 9 is a perspective view of a pair of identical fiber optic connectors oriented as they would be just prior to mutual engagement.

FIG. 10 is a side elevation of the connectors shown in FIG. 9 as they appear just after they have been initially engaged prior to mating.

FIG. 11 illustrates the connectors shown in FIGS. 9 and 10 after they have been turned counterclockwise relative to one another and just before their respective thread segments have cleared one another.

FIG. 13 is an exploded perspective view of a pair of contact alignment tube segments oriented just prior to engagement.

FIG. 14 is a cross section through the contact assembly illustrated in perspective view in FIG. 8d.

FIG. 20 is a perspective view of one of the connector assemblies illustrated in FIG. 9 shown next to a tool for installing one of the alignment tube segments illustrated in FIG. 13 into the connector assembly.

FIG. 21 is a cross section through the tool of FIG. 20 along lines 21—21.

FIG. 22 is a partial perspective view of the tool shown in FIG. 20 with the alignment tube segment initially cradled therein.

FIG. 23 is a view similar to that shown in FIG. 22 but with the core of the installation tool turned so as to capture the alignment tube segment just preparatory to installation thereof into the connector.

FIG. 24 is a cross section through the installation tool and the connector of FIG. 20 showing them as they are initially engaged, with the alignment tube still captured in the tool.

FIG. 25 is a cross section similar to FIG. 24 but showing the installation tool turned 180° so as to cause the alignment tube to be transferred to and captured by the connector.

FIG. 26 is a cross section through FIG. 24 showing the orientation of the alignment tube relative to the connector prior to the 180° turn of the installation tool.

FIG. 27 is a cross section similar to FIG. 26 but showing the orientation of the alignment tube after the installation tool has been turned so as to lock the tube in the connector.

DETAILED DESCRIPTION OF THE PREFERRED EMBODIMENT

Figure 12:
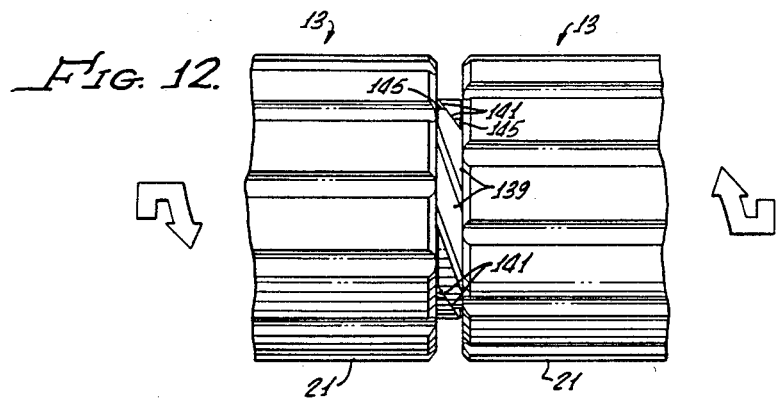
FIG. 12 shows the connectors of FIGS. 9-11 just after their respective thread segments have cleared one another and at a time when they have begun to turn clockwise relative to one another under the urging of their respective torque springs.

A cable assembly 11 terminated in a pair of connectors 13 which incorporate features of the present invention is illustrated in FIG. 1. One of the connectors 13 is coupled to a wall receptacle assembly 15, shown in greater detail in FIG. 4. The other connector 13 is connected to an identical connector 13 which terminates one end of an adjoining cable assembly 11. Coupled to one of the pair of connectors 13 by a lanyard 19 is a dust cap 17, shown in greater detail in FIG. 3. The pair of interconnected connectors 13 are illustrated in greater detail in FIG. 2. Only the front portion of one of the connectors 13 is shown in that cross-section; whereas the entire connector mated thereto is illustrated. It will be the latter which will be now described with reference to FIG. 2.

The connector 13 is comprised of two principally cylindrical members which, when assembled, are rotatable relative to one another. The first of these members is a coupling ring 21 whose front portion adjoins the corresponding coupling ring 21 of its mating connector 13 and whose open back face is closed by a cap 23. The second cylindrical member, rotatably mounted within the coupling ring 21, comprises a shell 31 and a fiber accumulation chamber assembly 28 whose front end is attached to the rear end of the shell 31. The fiber accumulation chamber assembly 28 consists of a front end 30 whose nose portion has external threads 55 mating with a set of internal threads 57 in the shell 31, and a rear end 29 which is swaged at its rim 70 to lock onto the front end 30. Together, the rear and front portions 29 and 30 define the fiber accumulation chamber 74 for containing several spare turns of the optic fiber 105.

Figure 6:
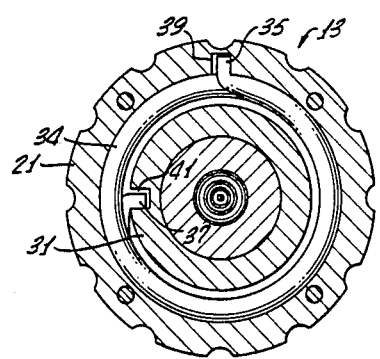
FIG. 6 is a cross-section through FIG. 2 along lines 6—6 illustrating the manner in which the biasing means, shown as a helical torque spring, is locked into slots in the core and in the coupling ring, respectively.
Figure 7:
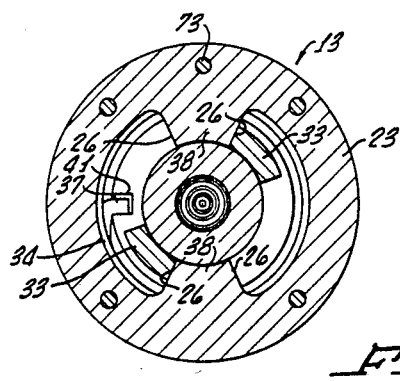
FIG. 7 is a cross-section through FIG. 2 along lines 7—7 illustrating the stop surfaces in a cap attached to the rear of the coupling ring which serve to define the range of rotation of the core within the coupling ring.

Housed within the coupling ring 21 is a torque spring 34 whose purpose is to bias the coupling ring 21 resiliently against rotation relative to the shell 31. The spring is aided in that function by a pair of radially-extending tabs 35 and 37 at its opposite ends which fit into a pair of axially-extending slots 39 and 41 in the locking ring 21 and the shell 31, respectively (FIG. 6). To define the range of motion of the coupling ring 21 relative to the shell 31, a pair of stop tabs 33 extends from the rear of the shell (FIGS. 7 and 8a) and they cooperate with radially-inwardly extending lobes 38 on the coupling ring cap. Rotational stop surfaces 26 on the lobes 38 define the full range of rotational travel of the ring 21 relative to the shell 31. The ring 21 is shown in FIG. 7 in its rest position relative to the shell 31; that is, with the ring 21 fully clockwise relative to the shell 31. In this position one pair of the four stop surfaces 26 abuts against a first pair of surfaces on the rotational stop tabs 33. When the shell is rotated counterclockwise against the restraining force of the torque spring 34, the opposite pair of the stop surfaces 26 abuts against the second pair of stop surfaces on the rotational stop tabs 33.

Located coaxially within the shell 31 is an insert 43 whose purpose is to support an optical contact assembly 45. The insert 43 resides slidably within an axially-extending bore 40 within the shell 31. Carried on the front end of the insert 43 is an alignment tube segment 47 which when combined with an identical such segment forms an entire alignment tube. The base 48 (FIG. 8a) of the alignment tube segment 47 rests against the forward surface 44 of the insert 43 (FIG. 8b). A first seal 59, located in a groove 61, and a second seal 63, in a groove 65, provide protection against contaminants which might enter the connector between the ring 21 and the shell 31 or between the shell 31 and the insert 43 from the front of the connector 13.

Extending from the front surface 46 of the shell 31 are a pair of aligning elements 75 and 77 (FIG. 8a). The aligning element 75 is in the shape of a round post, and the aligning element 77 forms an arcuate shroud having an inner axially-running recess 81 and an outer axially-running groove 79. The two aligning elements 75 and 77 are so configured that when a pair of connectors is engaged to be mated, the aligning post 75 of each shell 31 will enter the aligning groove 79 of the other shell 31 so that the two intermating shells 31 become rotationally interlocked. Running along the root of the shroud 77 is a slot 82 for receiving an indexing spring 51. A centrally-disposed detent 60 in the spring 51 mates with a slight dimple 58 in the base 48 of the alignment tube segment 47, maintaining the tube against rotation relative to the shell 31. The aligning tube segment 47 is held in place against axial movement by a rear stop surface 78 at the base of the shroud 77 adjacent the slot 82.

The optical contact assembly 45 is shown in greater detail in FIGS. 8d and 14. It includes a cylindrical tip in the form of contact bushing 111 adjacent to a spacer 113 which bears against a set of belleville washers 49. The bushing is press-fitted onto the tip of a pin body 108 which forms the principal part of the contact assembly. The spacer 113, the washers 49 and the washer 110 are slideably mounted on the tip of the pin body 108. Next to the belleville washers 49 is a washer 110 and next to it is a retention clip 115. As will be described hereinafter, the optical contact assembly 45 is inserted into the axial bore 42 of the insert 43 during assembly so that the contact retention clip 115 securely retains the contact assembly within the insert 43. With the contact assembly so anchored in the insert 43, when pressure is exerted against the bushing 111, the axially moveable contact element, which includes the bushing 111, the contact spacer 113 and the contact body 108 (see FIG. 14), is spring loaded by means of the belleville washers 49 which become compressed against the washer 110 seated in the retention clip 115. Moreover, the insert 43 itself is spring biased against axial movement relative to the shell 31 by a set of spring washers 53 (FIG. 8b) disposed between insert 43 and the forward rim of the fiber accumulation chamber assembly member 28. The spring washers 53 are preferably comprised of two subsets: a first set of bowed washers 53-2 and, sandwiched between them, a second series of belleville washers 53-1. The bowed washers 53-2 require less force to compress them than do the belleville washers 53-1. Consequently, when the connectors 13 are initially engaged in the manner depicted in FIG. 1 and FIG. 2 and the insert 43 begins to be pushed back into the connector in a manner to be explained shortly, a relatively light resistance is offered by the set of spring washers 53 during the initial portion of its excursion. Once the bowed washers 53-2 have been compressed, subsequent travel of the insert 43 within the shell 31 will require a greater force in order to overcome the resistance of the belleville washers 53-1. In keeping with a preferred manner of implementing the invention, the three biasing means of the connector: the belleville washer 49, the spring washers 53 and the torque spring 34, are so proportioned that the force required to compress the belleville washer 49 is less than that required fully to compress the spring washers 53, and the force required for compression of the latter is less than that developed in the axial direction by the torque spring 34 when it is torqued upon engagement of its connector.

In practice, the optic fiber 105 is prefabricated to form an assembly 18 (FIG. 8d) with the contact assembly 45 at its end and a strain relief assembly 90 spaced along the fiber 105 several inches from the contact 45. This assembly is created prior to insertion of the contact assembly into the insert 43 and will therefore be described next.

The fiber 105 extends through an axially-extending bore in the contact assembly 45 all the way to the face of the bushing 111. From the back of the contact assembly 45 the fiber 105 emerges with only its immediate protective coating intact (such as silicon/Hytrel) and with the rest of its jacket stripped away. The coated fiber is anchored at the rear end of the accumulation chamber assembly 28 by a strain relief housing 93 held in the neck of the chamber assembly 28 by an internally-threaded compression nut 97. The strain relief housing 93 includes a rearwardly-extending member 125 on which a shrink tube 129 may be disposed to hold the optic fiber in place. Extending through the shrink tube support member 125 is an axial bore 100 which terminates in a reduced axial bore 102 running to the front end of the strain relief housing 99. When the cable assembly (FIG. 8d) is initially prefabricated, the optic fiber is stripped in the manner shown in FIG. 2 and its strength members, typically Kevlar strands 104, are threaded in the manner shown in FIG. 2, until they emerge past a strain relief compression nut 95 which is threaded onto the externally-threaded tip 99 of the strain relief housing 93. Similarly, the outer jacket 103 of the optic fiber is stripped back so that it abuts against the end of the larger bore 100 of the strain relief housing 99.

With the various layers of the optic fiber cable thus stripped, the jacketed fiber 105 is threaded through the axial bores 100 and 102 and through the axial bore 106 of the strain relief compression nut 95. The optic fiber strength members 104 are threaded around the inner rim of the forward end 99 of the strain relief housing 93 and around a compression washer 98 which is sandwiched between the strain relief housing 93 and its associated compression nut 95. The ends of the strength members 104 are pulled through the axial bore 106 and all of them are tightly anchored by tightening the strain relief compression nut 95 onto the threaded tip 99 of the strain relief housing 93. The jacketed fiber optic cable is held securely in place by pulling a shrink tube 129 over it and heating the shrink tube, thereby locking the jacket relative to the shrink tube support member 125. Moisture proofing is provided by the shrink tube support seal 127 midway along the length of the member 125. Finally, a molded boot 131 is pulled over the shrink tube covered support member 125.

The contact cable strain relief assembly 18 is now ready to be installed in the connector 13. Before that installation is described it will be helpful to understand the manner in which the rest of the connector is assembled. First a neoprene wiper seal 72 is installed in a groove near the front of the coupling ring 21 and a similar wiper seal 71 is installed in a like groove in the back of the coupling ring cap 23. The front and back wiper seals 71 and 72 help prevent moisture from entering the connector. The torque spring 34 is next inserted from the rear into the coupling ring 21, with its rear locking tab 35 entering the retaining slot 39 in the ring 21. The torque spring 34 is then locked in place by fastening the coupling ring cap 23 to the coupling ring 21 with a set of four cap-retaining screws 24. A pin 73 anchored in the coupling ring cap 23 extends partially into the retaining slot 39 to help keep the torque spring 34 in place.

With the coupling ring cap 23 so installed, the shell 31 is next dropped in place from the front of the coupling ring 21 after it has received a front seal 59 which is retained in a groove 61. The shell 31 is axially positioned within the coupling ring 21 by its rear stop surface 32 which abuts against a stop surface 25, in the form of a pair of radially inwardly extending ledges 25 on the cap 23.

With the shell 31 inserted in the coupling ring 21, the next step is to drop the insert 43 into the axial bore 40 of the shell 31, entering it from the rear of the shell through the coupling ring cap 23. The set of spring washers 53 is then placed behind the insert 43 in the position shown in FIG. 2, and arranged in the manner illustrated in FIG. 8b. It is now time to attach the fiber accumulation chamber assembly 28 to the shell 31. The assembly 28 will have been made up of its parts 29 and 30, as previously described, and will have been provided with a seal 67 in its forwardly located groove 69. The chamber assembly 28 is engaged with the shell 31 by intermating their respective threads 55 and 57. The threads 55 and 57 are so arranged that the shell 31 must be turned counterclockwise relative to the chamber assembly 28, as viewed from the front of the connector, when the two are engaged and tightened. Since the shell 31 is torqued clockwise within the coupling ring 21 by the spring 34, this reverse threading arrangement permits a secure grip between the ring 21 and the shell 31 during the tightening of the chamber assembly's external thread 55 relative to the shell's internal thread 57. By gripping the flat 36 at its rear, the chamber assembly 28 is turned until a stop surface 84 near the forward tip of the chamber assembly abuts a corresponding stop surface 83 on the shell 31 just beyond its threads 57.

Clearance between the chamber assembly 28 and the coupling ring cap 23 is provided by a clearance surface 85 on the coupling ring cap and a corresponding clearance surface adjacent thereto on the front portion 30 of the chamber 28. To insure freedom of rotation of the coupling ring 21 and its associated cap 23 relative to the accumulation chamber 28, the axial spacing between the stop and clearance surfaces 84 and 87, respectively, on the forward member 30 of the accumulation chamber 28 is slightly greater than that between the stop surface 83 of the shell 31 and the clearance surface 85 on the coupling ring cap 23.

FIG. 2 illustrates the disposition of the insert 43 and the spring washers 53 behind it at a time when the connectors 13 are interlocked, at which time the insert 43 is pushed back into the connector, compressing spring washers 53. A better view of the disposition of insert 43 and the spring washers 53 when the connector is not engaged appears in FIG. 4 which illustrates the receptacle assembly 15 in FIG. 1. The assembly 15 will be described in detail shortly with reference to FIG. 4. What is of interest here is that the insert and the spring washers shown in FIG. 4, as well as the contact retained by the insert, are the same as the corresponding parts in FIG. 2. These parts are numbered 43a, 53a and 45a in FIG. 4 and show the insert 43a in its forward position, wherein the spring washers 53a are at least partially expanded, and the insert 43a is restrained in its forward position inside the shell 31a by the alignment tube section 47a whose base 48a bears against the stop surface 78a of the shroud 77a.

With the major elements of the connector assembled as just described, it is time to insert the subassembly 18 (FIG. 8d) therein. Basically this is done by first inserting the forward part of the assembly, particularly the contact assembly 45, through the rear neck of the chamber assembly 28, after which the strain relief portion 90 of the subassembly 18 is anchored at the rear of the chamber assembly 28.

The front end of the cable assembly, comprising principally the contact assembly 45, is snapped in place in the insert 43 so that its retention clip 115 enters a constricted portion 118 (see FIG. 8b) of the axial bore 42 which extends through the insert 43. This is best accomplished with a simple contact insertion tool in the shape of a slim metal rod having an axially-extending slot in its forward tip dimensioned to receive the rear of the contact assembly 45. With the rear of the contact assembly 45 snapped into its slotted tip, the tool is inserted through the chamber assembly 28 so as to push the contact assembly 45 firmly into the axial bore 42 of the insert 43. When the retention clip 115 has fully engaged, its collar 114 will have cleared the constricted portion 118, snapping open and locking the clip 115 and the contact assembly 45 in place in the insert 43 (see also FIG. 15). The contact insertion tool can then be withdrawn.

With the optical contact assembly 45 snapped in place in the insert 43, the optic fiber 105 trailing from its rear is looped a few times around inside the chamber 74 and then the strain relief housing 93 is locked in place in the rear of the fiber accumulation chamber assembly 28 by means of the compression nut 97. This is accomplished simply by dropping the strain relief housing 93 into the rear of the chamber 28. A hexagonal section 121 on the strain relief housing 93 seats in a similarly configured section 123 on the inside of the rear neck of the chamber 28 so as to prevent the strain relief housing 93 from rotating while the compression nut 97 is turned on the threads 91 of the chamber assembly 28 to lock the strain relief housing 93 in place. A seal 107 held in place in a groove 109 provides resistance against moisture entering the connector from the rear around the strain relief housing 93. Sandwiched between a collar 94 toward the rear end of the chamber 28 and the compression nut 97 is a harness ring 101 by which the lanyard 19 is held in place on the connector.

The last step in assembling the connector 13 is to insert the alignment tube segment 47. This is preferably done with a specially-designed tool which is depicted in FIGS. 20-27 and which is the invention of and the subject of a separate patent application by Norbert L. Moulin and James T. Hartley for "Contact Alignment Tube Insertion Tool," and assigned to the assignee of the present invention. By means of this tool the alignment tube segment 47 is inserted with its base 48 oriented so that its reduced diameter portion 48-1 is adjacent to the recess 81 in the shroud 77. This reduced diameter portion 48-1 is of substantially the same radius as the recess 81 so that there is sufficient clearance that the alignment tube segment 47 can be moved axially toward the axial bore 40 of the shell 31. When the stop surface 50 of the alignment tube base 48 abuts the front stopping surface 44 of the insert 43, sufficient pressure is exerted by means of the insertion tool upon the alignment tube base 48 to partially compress the spring washers 53. This provides sufficient clearance between the insert front stopping surface 44 and the shroud insert front stopping surface 78 to allow the alignment tube segment 47 to be rotated 180° about its longitudinal axis, thereby moving the larger diameter portion 48-2 of its base 48 into abutment against the stop surface 78 of the insert shroud 77. This also causes the detent 60 in the indexing spring 51 to interlock with the recess 58 in the alignment tube base 48. This is made possible by a centrally-disposed opening in the indexing spring recess 82 through which the detent 60 can extend into the dimple 58 in the alignment tube segment base 48.

More particularly, the insertion tool 211 depicted in FIGS. 20–27 comprises a knurled knob 213 sized typically to be conveniently held and grasped by one hand. Centrally disposed within the knob 213 is a cylindrical cavity 214 through which extends a post 215 anchored in the rear wall of the knob in a countersunk hole 217 into which it is shrink fitted. Disposed within the cylindrical cavity 214 is a core 225 having a cylindrical base through which there extends an axial bore 216 into which the shaft 215 snugly fits. The core 225 is retained in its cavity 214 by the provision of a peripherally-extending V-shaped groove 227 which interacts with a retaining bolt 229 having a detent 231 at its end. The core 225 is held in place in its cavity 214 so that the knob 213 is free to rotate around the core 225, with the post 215 acting as its shaft and the core 225 acting as a bearing for that shaft. A pair of indents (not shown) in the rear wall of the V-shaped groove 227 and spaced 180° apart, in cooperation with the detent 231, provide a pair of "rest" positions for the knob 213 relative to the core 225.

The protruding end of the post 215 has a cylindrical bore 219 which extends sufficiently far to permit the shank of the alignment tube segment 47 to be fully inserted therein with the base 48 thereof resting on the rim 222 of the post 215. Securely anchored in the wall portion of the post 215 which defines the bore 219 are a pair of guide pins 223 which extend from the rim 222 just enough to fully enter a pair of guide holes 62 in the base 48 of the alignment tube segment when that segment is fully inserted in the tool, as seen in FIG. 22.

Extending from the cylindrical base of the core 225 is a guide post 233 and a retaining shroud 235. The post 233 and the shroud 235 are nearly identical in shape to the corresponding aligning elements 75 and 77 of the connector 13, so that when the tool is inserted into the front end of the connector 13, the post 233 enters into the aligning groove 79 of the connector's shroud 77, and similarly the aligning post 75 of the connector 13 enters the aligning groove 236 of the shroud 235 of the tool 213. The principal difference between the corresponding shroud members 235 and 77 on the tool 213 and the connector 13, respectively, is the provision of an arcuate slot 237 near the tip of the retaining shroud 235.

The retaining slot 237 and its purpose are best seen in FIGS. 22 and 23. To install the alignment tube segment 47 into the connector 13, it is first inserted into the tool 211 as shown in FIG. 22. The tool there is shown in one of its two "rest" positions in which its guide pins 223 are so located that when they enter the guide holes 62 in the alignment tube base 48 the reduced diameter portion 48-1 of the base is in registry with, and clears the edges of, the retaining shroud 235.

The next step is simply to turn the knob 213 of the tool relative to its core 225. Since the shaft 215 is fastened to and turns with the knob 213, the alignment tube segment 47 is turned about its axis 180°, causing the enlarged diameter portion 48-2 of its base fully to enter the retaining groove 237. This orientation of the knob 213 relative to the core 225 represents the second "rest" position of the tool, and it is securely held in that position until the knob is again turned.

With the alignment tube segment 47 securely held in the tool 211, the tool is next inserted into the front end of the connector 13, as shown in FIG. 24. With the tool 211 fully inserted in the connector 13, the alignment tube segment 47 is brought to its "rest" position in the connector so that its rear stop surface 50 is brought to rest against the front stop surface 44 of the insert 43. As best seen in FIG. 26, the retaining spring 51 is in place in the connector 13, but the alignment tube segment 47, and particularly its base 48, is not yet locked in place in the connector because the enlarged portion 48-2 of the base 48 is located opposite the alignment post 75 of the connector which has a slight flat at its root to provide a clearance for that purpose.

To lock the alignment tube segment 47, and particularly its base 48, in position, the insertion tool knob 213 is turned 180° into its first "rest" position in which the alignment tube segment base 48 is free to exit therefrom, as shown in FIG. 22. This half turn of the knob 213 also has the effect of rotating the alignment tube segment base 48 relative to the connector 13, and in particular relative to its alignment tube shroud 77 and the indexing spring 51. As a result, the enlarged portion 48-2 of the alignment tube segment base 48 is turned so as to fully enter the slot 82 at the base of the shroud 77 (see FIG. 8a for this detail of the slot 82). In this position the base 48 is held securely by the front stopping surface 78 of the shroud 77 against axial movement, and is locked against rotation by the engagement of its dimple 58 by the detent 60 of the indexing spring 51. Consequently, when the insertion tool 211 is withdrawn, the alignment tube segment 47 is securely held in position in the connector 13.

In accordance with an important feature of the invention, a set of arcuate camming members, shown as three thread segments 139, are disposed at the front end of the coupling ring 21. The thread segments 139 of each set are disposed symmetrically about the forward periphery of the ring 21 and each of them includes a rear camming surface 141, a sloped front surface 142 terminating in a flat plateau 143 and a square tip 145. Each thread segment 139 of a set overlaps the next such thread segment in that set. Three thread segments per connector have been found to be ideal. However, any number greater than one would be operative.

The general orientation of a pair of connectors 13 which are to be engaged and interlocked by means of the coupling mechanism of the present invention is illustrated in FIG. 9. When a pair of such connectors 13 are to be engaged they are so oriented relative to each other that they are 180° out of a mirror image position. When the two connectors are so situated, the alignment post 75 of each is directly opposite to and in registry with the alignment tube shroud groove 79 of the other.

Engagement is initiated by sliding the connectors toward one another along their respective axes, the aligning post 75 of each being guided along the groove 79 of the other, until their respective thread segments 139 abut. As seen in FIG. 10, in this position the flat tips 145 of the thread segments clear one another, permitting the sloped front surfaces 142 of one set of thread segments 139 to rest against the corresponding surfaces of the other set of thread segments.

Figure 5:
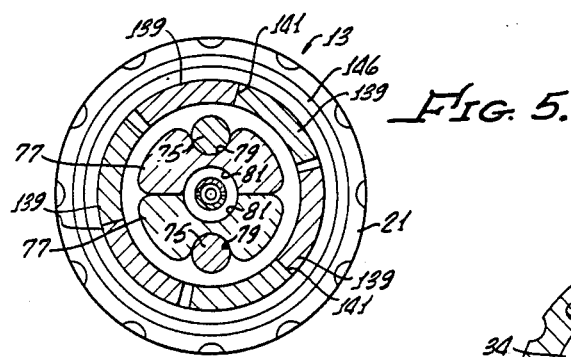
FIG. 5 is a cross-section through FIG. 2 along lines 5—5 illustrating the engagement of the keying means of a given connector with that of the connector with which it is mated.

The next step in interlocking the connectors 13 is to twist their coupling rings in opposite directions, each of them counterclockwise relative to the other, while exerting a slight force in the directions indicated by arrows to hold them in engagement. The resulting turning motion causes the coupling rings 21 to be forced apart slightly as the sloped front surfaces 142 of one set of thread segments 139 rides up on the corresponding sloped front surfaces of the other set of thread segments. FIG. 11 shows the coupling rings in the position where the sloped front surfaces 142 of one of the connectors 13 have ridden all the way up the corresponding surfaces of the other connector to the point where the flat plateau regions 143 of the respective sets of thread segments 139 interface. It should be kept in mind that throughout this turning operation the aligning post 75 and the alignment tube shroud 77 of the connectors are interlocked rotationally in the position best shown in FIG. 5 and that, therefore, the remaining elements of both connectors about which the coupling rings 21 rotate, including the shell 31, the accumulation chamber 28, and the components housed within them, are fixed against rotation and remain in rotational alignment relative to one another.

To complete the interlocking of the connectors 13, their coupling rings 21 are turned slightly beyond their positions shown in FIG. 11 to the point where the flat tips 145 of one set of thread segments 139 clear the corresponding flat tips 145 of the other set of thread segments, while maintaining the slight axial pressure urging the connectors 13 toward each other. As soon as the coupling rings 21 are turned past the position just mentioned, they will become free to move further toward each other sufficiently so that the tips 145 of one set of thread segments 139 move axially past the tips of the other set of thread segments. This causes the thread segments 139 of one of the connectors 13 "to advance" relative to the thread segments of the other connector 13 and, more specifically, to engage the next segment 139 located counterclockwise relative to the previously engaged such segment.

Interlocking of the connectors is completed by releasing their rings 21. It will be recalled that the twisting of the rings 21 counterclockwise was done against the restraining forces of their respective torque springs 34. Therefore, when the coupling rings 21 are released they will be turned clockwise relative to each other under the urging of their respective torque springs 34. Moreover, with the flat tips 145 of the two sets of thread segments 139 having moved past each other, the thread segments of one of the connectors 13 will begin to ride with their rear inclined camming surfaces 141 on the corresponding camming surfaces 141 of the other connector. This condition is depicted in FIG. 12. As the result of this camming action, as the coupling rings 21 are twisted clockwise relative to one another by their torque springs 34, they are also drawn axially toward one another as well. This clockwise twisting and axial drawing together continues until a pair of seals 146 on the forward rims of the coupling rings 21 become sealingly compressed and the coupling rings 21 of the respective connectors 13 abut. This still leaves the torque springs 34 partially wound, thus continuing to exert their twisting action on the coupling rings 21. The resulting coupling of the connectors 13 is very secure. They can be readily disengaged by reversing the coupling process. However, due to the force of the torque springs 34 they are quite secure against accidental disengagement due to vibration and, due to the sliding friction between their thread segments, are highly resistant against disengagement by a simple axial force tending to pull them apart regardless of the size of that force.

With the connectors 13 engaged as shown with reference to FIG. 2, their respective alignment tube segments 47 engage so that the rear inclined surface 52 of one of the alignment tube segments 47 interfaces with the forward inclined surface 56 of the other alignment tube segment 47. The two segments 47 combine to form a contact alignment tube which constitutes an additional significant feature of the invention. In implementing this feature of the invention, the tube segments 47 must be pressed together firmly in order that they fully engage and properly function to bring their respective contact assemblies 45 into alignment.

Figure 17:
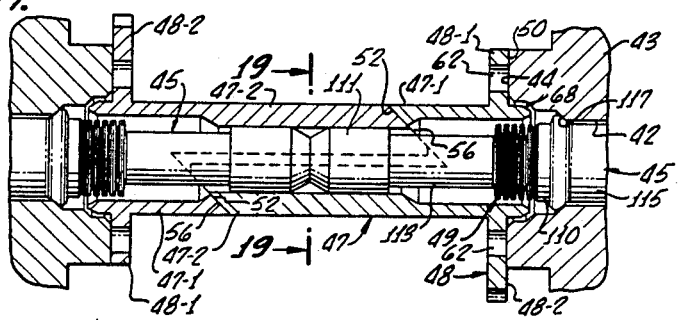
FIG. 17 is a cross section like FIG. 15, showing the alignment tube segments fully interfitted and their respective contact assemblies fully engaged and completely aligned.

The manner in which the tube segments 47 interfit during the engagement of a pair of connectors 13 is illustrated in and is apparent from FIGS. 15–19. Initial contact is between the contact bushings 111, followed by sliding engagement of the alignment tube surfaces 52 and 56 (FIG. 16), concluding with full engagement of the alignment tubes and of the contact assemblies 45 (FIG. 17).

A pair of axially-interfitting, mutually-complementary alignment tube segments 47 is illustrated in perspective view in FIG. 13. The tube segments 47 are identical and, when interfitted, constitute an alignment tube having a single longitudinal axis. Each tube segment includes a pair of axially spaced-apart, parallel end walls 52 and 56, at which the segments 47 abut when they are interfitted. Furthermore, each tube segment 47 comprises a root portion 47-1 which is fully cylindrical in cross section and terminates in the first end wall 52, and an elongated tip portion 47-2 which is semi-cylindrical in cross section and terminates in the second end wall 56. Integral with the root portion 47-1 is the generally disk-shaped base 48 having a first portion 48-1 of relatively reduced diameter relative to the second portion 48-2 of the base having the aligning recess 58 at its center. A pair of holes 62 in the base serve to orient the tube segment when it is installed by means of the insertion tool 211 described with reference to FIGS. 20–27.

In the connector disclosed herein, the tube segments 47 form a part of a contact alignment system which includes a pair of the contact assemblies 45, each contact assembly having a cylindrical tip, shown as an alignment bushing 111 slideably mounted within, and approximately coaxially with, a respective one of the tube segments 47. Each contact assembly 45 is mounted within a connector 13, and specifically inside the axial bore 42 of the connector's insert 43, as more fully described with reference to FIGS. 8b and 8d. The tube segments 47, on the other hand, are mounted on the front stopping surfaces 44 of the inserts 43. Due to the elasticity of the belleville washers 49 which form part of the connector assemblies 45, the bushings 111 are slideable relative to their associated tube segments 47.

Figure 15:
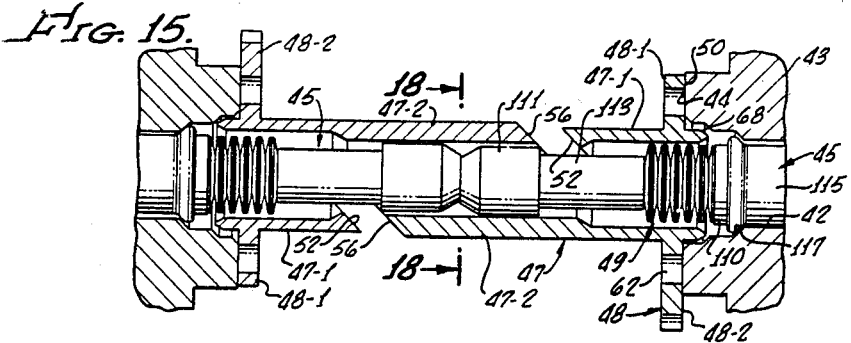
FIG. 15 is a cross section through the alignment tube segments of FIG. 13 at the moment of their initial engagement.
Figure 16:
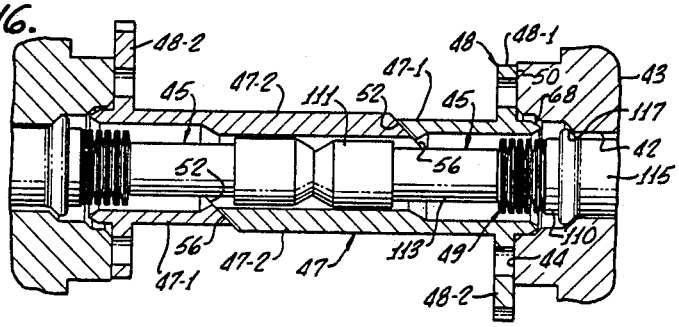
FIG. 16 is a cross section like FIG. 15 showing the alignment tube segments partially interfitted.
Figures 18, 19:
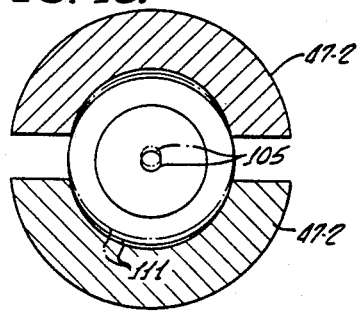
FIG. 18 is a cross section through the alignment tube segments of FIG. 13 taken along lines 18—18 of FIG. 15 and showing the alignment tube segments prior to being fully interfitted.
FIG. 19 is a cross section like FIG. 18 taken along lines 19—19 of FIG. 17 and showing the alignment tube segments after fully interfitting.

When the pair of connectors 13 are initially engaged, their contact bushings 111 abut before their respective tube segments 47 are fully interfitted. This is depicted in FIG. 15. As additional pressure is exerted on the connectors 13 to force them into engagement, the tube segments 47 slide toward full engagement, with their front inclined surfaces 56 approaching their rear inclined surfaces 52. Initial contact between the inclined surfaces 52 and 56 is shown to occur in FIG. 16. It is important to observe at this point that the outside diameters of the bushings 111 are slightly larger than the inside diameters of their associated alignment tube segments 47. Consequently, each tube segment 47 rides upon its associated bushing 111 so that their respective axes are slightly offset relative to one another. In effect, each tube segment 47 rides with the inside edges of its tips 47-2 on the periphery of its associated bushing 111, as best seen in FIG. 18.

When the connectors are pressed further together, the tube segments 47, whose axes are initially offset relative to one another, abut and the forward inclined surface 56 of each begins to slide on the rear inclined surface 52 of the other. The effect of this is to force the tube segments into alignment with each other until they assume a common axis. In the course of this shift the tube segments 47, which are resilient, flex so as to conform to the contours of their respective bushings 111, as shown in FIG. 19. As a result, the bushings 111 are also brought into mutual alignment along the common axis of the tube segments 47. This state is illustrated in FIGS. 17 and 19.

The force necessary to bring the alignment tube segments 47 into full engagement may be precisely predetermined by selecting the spring constant of the spring washers 53 which are compressed between the fiber accumulation chamber 28 and the contact supporting insert 43. The spring washers 53 include a stack of bowed washers 53-2 and belleville washers 53-1 combined in numbers to create a variable rate spring in which the bowed washers 53-2 are flexible relative to the belleville washers 53-1 and tend to become compressed first as the inclined surfaces 52 and 56 first become seated. Then the more rigid belleville washers 53-1 become compressed under the axial force exerted by the torque springs 34, and it is the spring constant of the belleville washers 53-1 which ultimately determines the axial force with which the guide tube segments 47 of the connectors 13 are urged into engagement. Significantly, the axial force with which the shells 31 of the connectors 13 are urged axially toward one another under the influence of their respective torque springs 34 is sufficient to compress at least partially both the bowed washers 53-2 and the belleville washers 53-1.

It is also desirable for proper coupling of the optic fibers 105 in the respective connectors 13 that their respective optic contact assemblies 45 be mated with a predetermined force. This function is fulfilled by the contact assembly belleville washers 49. Advantageously, the axial force required to compress the belleville washers 49 is intermediate in magnitude between the axial forces required to compress the bowed washers 53-2 and the belleville washers 53-1, so that the bowed washers 53-2 begin to compress first, followed by compression of the belleville washers 49 and concluding with the compression of the belleville washers 53-1.

While the connector 13 of the present invention has been illustrated as being particularly capable of securely interlocking with an identical connector, it should be noted that it is also capable of interlocking in a secure fashion with a wall-mounted receptacle as well as with a dust cap assembly. Turning first to the wall-mounted receptacle 15, it is comprised of similar parts to that which make up the connector 13 and its corresponding parts are marked with the same reference numerals as they are in FIG. 2 but with the suffix "a" added. The principal difference between the receptacle assembly 15 and the connector 13 is the omission of the torque spring 34. Instead, the coupling ring 21a of the receptacle 15 is pinned to the shell 31a by a locking pin 163 which also serves to prevent rotation of the shell 31a relative to an externally-threaded collar 153 used to fasten the receptacle 15 to a wall 151. The collar 153 is engaged with an internally-threaded nut 155 to anchor the assembly on the wall 151. An abbreviated collar 30a, representing just the tip portion of the chamber assembly 28 shown in FIG. 2, locks the insert 43a in the shell 31a. The rear portion of the shell 31a is slightly modified relative to its counterpart in FIG. 2 to account for the slightly different configuration of the collar 30a with which it mates. The front portion of the shell 31a is substantially identical with its counterpart in FIG. 2, with the exception of a groove 159 which receives a guide pin 161 in the coupling ring 21a.

To lock the connector 13 onto the receptacle assembly 15, the two are initially engaged in a manner similar to that described with reference to FIGS. 10–12. The coupling ring 21 of the connector 13 is then rotated relative to the coupling ring 21a of the receptacle assembly, resulting in the interlocking of those coupling rings as well as the axial forces being exerted on their inserts and contact assemblies in the manner described with reference to FIG. 2.

The dust cap assembly 17 illustrated in FIG. 3 can be used to protect either the connector 13 or the receptacle assembly 15. It shares some key parts with the connector 13 of FIG. 2, and these are marked with the same reference numerals except for the addition of the suffix "b". Thus, the dust cap assembly 17 includes a shell 31b, which does not include a contact assembly but which does include the forwardly-extending aligning elements 75b and 77b dimensioned to mate with the corresponding elements 75 and 77 of the connector 13 and with the elements 75a and 77a of the receptacle assembly of FIG. 4. Wrapped around the shell 31b is a torque spring 34b, and both the shell 31b and the spring 34b are housed within a coupling ring 21b whose front end is configured similarly to the front ends of the coupling rings of the connector 13 and the receptacle assembly 15. Opposite ends 35b and 37b of the torque spring 34b are anchored in the coupling ring 21b and in the shell 31b, respectively; and the torque spring 34b is retained within the coupling ring 21b by means of a coupling ring cap 23b held in place by an externally-threaded plug 165 whose threaded end is securely turned into a correspondingly threaded end portion of the shell 31b. The lanyard 19 securing the dust cap assembly to the connector 13 is attached by a threaded bolt 167 to the plug 165.

The front end of the coupling ring 21b is provided with thread segments 139b disposed and configured identically to those illustrated with reference to the connector 13; and the dust cap assembly 17 is engageable for interlocking with the connector 13 in exactly the same manner as explained with reference to FIGS. 10–12. It is also engageable with the receptacle assembly of FIG. 4 in the same manner in which a connector would be assembled therewith.

From the foregoing it is apparent that there has been described a coupling mechanism which provides rapid and secure coupling of the diverse variety of components which have, for sake of specific example and primary utility, been described as connectors of the fiber optic type. It is apparent that the coupling mechanism of the present invention could find application in other fields where secure intercoupling is desired. It is also apparent that by virtue of the incorporation of the coupling mechanism of the present invention therein, there has been provided an improved type of connector which may advantageously be of the fiber optic connector type, but may just as well serve to interconnect electrical elements.

In describing the coupling mechanism of the present invention in the context of a fiber optic connector, a hermaphroditic connector has been selected as the exemplary embodiment. This is appropriate because some of the particular design features incorporated in the coupling mechanism described herein have permitted the coupling mechanism to mate with its identical counterpart and to permit its use on a connector which likewise is capable of intermating with another like connector. It will be understood, nevertheless, that in its broad concept the coupling mechanism of the present invention can be applied to great advantage in non-hermaphroditic devices and connectors as well. More particularly, even though the coupling devices which are incorporated in a pair of components which are to be intercoupled may be configured identically as described herein, they may be utilized to interconnect dissimilar components. This was illustrated with reference to the dust cap of FIG. 3 and the receptacle assembly of FIG. 4. By the same token, the coupling mechanism of the present invention may be used to interconnect a pair of connectors, one of which has a set of pins while the other has a set of sockets.

There has also been described a contact alignment system which may find particular use in combination with the coupling mechanism of the invention in hermaphroditic connectors. It will be understood, however, that the contact alignment system of the present invention may also be used in hermaphroditic connectors using other types of coupling mechanisms.

What is claimed is:

1. A hermaphroditic coupling mechanism comprising in combination:
   (a) a core;
   (b) a coupling ring mounted for rotation about said core;
   (c) means on said core and said ring to stop rotation of said ring relative to said core in a first direction;
   (d) means coupled between said coupling ring and said core to resiliently bias said ring against rotation relative to said core in the opposite direction;
   (e) keying means on said core extending beyond the front end of said coupling ring and configured to anti-rotationally interlock with the corresponding means of an identical coupling mechanism when said coupling mechanisms are engaged to be mated; and
   (f) a plurality of thread segments at the front end of said coupling ring,
      (1) each said thread segment having first and second camming ramp surfaces facing toward the front end and the rear end of said coupling ring, respectively,
      (2) the thread segments of a given one of said coupling mechanisms being configured so that when said coupling mechanism is engaged with its identical counterpart under a force linearly urging said coupling mechanisms toward each other and their keying means interlock, their first camming ramp surfaces abut and said linear force is translated thereby into a rotational force tending to turn each said ring in said first direction relative to its core against its stop means,
      (3) whereby engagement of said coupling mechanisms by linear force along is prevented, and engagement of said coupling mechanism with its identical couterpart is made possible only by twisting at least one of said coupling rings in said opposite direction relative to its core against the force of said biasing means until the threads of one coupling ring clear the threads of the other coupling ring, at which point, under the urging of said linear force, the respective threads of said coupling rings move past each other axially so that, when said coupling ring is released, it is turned in said first direction by its biasing means, causing the threads of the respective coupling rings to engage along their second camming ramp surfaces, and said rings to move toward each other axially by the camming action of said second cammlng ramp surfaces.

2. The coupling mechanism of claim 1 characterized further in that said biasing means is a helical spring housed in said coupling ring and anchored at one end in said coupling ring and at the opposite end in said core.

3. The coupling mechanism of claim 2 characterized further in that said helical spring terminates at its opposite ends in a pair of radially-oriented tabs, and in that said coupling ring and said core include axially-extending slots for receiving respective ones of said tab members.

4. A hermaphroditic connector comprising in combination:
   (a) an elongated, cylindrical core assembly having a front end and a back end;
   (b) a coupling ring mounted for rotation about the front end of said core assembly;
   (c) means coupled between said coupling ring and said core assembly to resiliently bias said ring against rotation relative to said core assembly in the opposite direction;
   (d) a contact element mounted on the front end of said core assembly;
   (e) keying means on said core assembly extending toward and beyond the front end of said coupling ring and configured to anit-rotationally interlock with the corresponding keying means of an identical connector when the two connectors are engaged to be mated; and
   (f) a plurality of thread segments at the front end of said coupling ring,
      (1) each said thread segment having first and second camming ramp surface facing toward the front end and the rear end of said coupling ring, respectively,
      (2) the thread segments of a given one of said connectors being configured so that when said connector is engage with its identical couterpart under a force linearly urging said connectors toward each other and their keying means interlock, their first camming ramp surfaces abut and said linear force is translated thereby into a rotational force tending to turn each said ring in said first direction relative to its core against its stop means,
      (3) whereby engagement of said connectors by linear force alone is prevented, and engagement of said connector with its identical counterpart is made possible only by twisting at least one of said coupling rings in said opposite direction relative to its core against the force of said biasing means until the threads of one coupling ring clear the threads of the other coupling ring, at which point, under the urging of said linear force, the respective threads of said coupling rings move past each other axially so that, when said coupling ring is released, it is turned in said first direction by its biasing means, causing the threads of the respective coupling rings to engage along their second camming ramp surfaces, and said rings to move toward each other axially by the camming action of said second camming ramp surfaces.

5. The connector of claim 4 characterized further in that said contact element is slidably mounted on said core assembly and is spring loaded so as to resiliently bias it against movement from a rest position to a retracted position toward the rear of said core assembly when said identical connectors are fully mated.

6. The connector of claim 5 characterized further in that said connector includes a spring biased alignment tube segment partially surrounding said contact and slidably mounted on said core assembly for linear movement relative to said contact toward the rear of said core assembly against said bias.

7. The connector of claim 6 characterized further in that said alignment tube segment is configured to form a complete alignment tube with the corresponding alignment tube segment of said identical connector with the two connectors are fully mated.

8. The connector of claim 6 characterized further in that said alignment tube segment has a root portion terminating in a first end wall and an elongated tip portion semi-cylindrical in cross section extending beyond said first end wall and terminating in a second end wall, said tube segment being characterized in that a pair of such tube segments interfit to form a single alignment tube.

9. The connector of claim 8 characterized further in that said end walls are slanted relative to the longitudinal axis of the alignment tube formed by said segments.

10. The connector of claim 8 characterized further in that the walls of said tube segment are resilient.

11. The connector of claim 10 characterized further in that the end walls of said alignment tube lie in parallel planes.

12. The connector of claim 11 characterized further in that the internal diameter of said alignment tube segment is smaller than the external diameter of the contact element which it partially surrounds.

13. The connector of claim 11 characterized further in that the tip portion of said tube segment is greater in length than said root portion.

14. The connector of claim 13 characterized further by a mounting base integral with the root portion of said tube segment.

15. The connector of claim 6 characterized further in that said connector includes:
(a) an insert within said core assembly, said insert having an axially-extending bore, said alignment tube segment being mounted on the front end of said insert, and said contact being slidably mounted in said axially extending bore;
(b) first resilient means between said insert and said core assembly to bias said insert against movement toward the rear of said assembly; and
(c) second resilient means between said contact element and said insert to bias said contact element against rearward movement within said insert.

16. The connector of claim 15 characterized further in that said first resilient means has a spring constant which exceeds the spring constant of said second resilient means.

17. The connector of claim 15 characterized further in that said first resilient means has an initial spring constant which is less than that of said second resilient means and an ultimate spring constant which is greater than that of said second resilient means.

18. The connector of claim 15 characterized further in that it includes a helical torque spring housed within said coupling ring and anchored at opposite ends between said coupling ring and said core assembly to bias said coupling ring against rotation around said core assembly.

19. The connector of claim 18 characterized further in that when said connector is fully mated with its identical couterpart the core assemblies of the respective connectors are thrust toward each other under the urging of their respective helical torque springs with an axial force which is sufficient to at least partially compress the first resilient means of each of said connectors.

20. A connector mateable with another device comprising the combination:
(a) an elongated, cylindrical core assembly having a front end and a back end;
(b) a coupling ring mounted for rotation about the front end of said core assembly
(c) means coupled between said coupling ring said core to resiliently bias said ring against rotation relative to said core in the opposite direction;
(d) a contact element mounted on the front end of said core assembly;
(e) keying means on said core assembly extending toward and beyond the front end of said coupling ring and configured to anti-rotationally interlock with corresponding keying means of said device when said device and said connector are engaged to be mated; and
(f) a plurality of thread segments at the front end of said coupling ring,
(2) each said thread segment having first and second camming ramp surfaces facing toward the front end and the rear end of said coupling ring, respectively,
(2) the thread segments of a given one of said connector and said device being configured so that when said coupling mechanism is engaged with its identical counterpart under a force linearly urging said connector and said device toward each other and their keying means interlock, their first camming ramp surfaces abut and said linear force is translated thereby into a rotational force tending to turn each said ring in said first direction relative to its core against its stop means,
(3) whereby engagement of said connector and said device by linear force alone is prevented, and engagement of said connector with said device is made possible only by twisting at least one of said coupling rings in said opposite direction relative to its core against the force of said biasing means until the threads of one coupling ring clear the threads of the other coupling ring, at which point, under the urging of said linear force, the respective threads of said coupling rings move past each other axially so that, when said coupling ring is released, it is turned in said first direction by its biasing means, causing the threads of the respective coupling rings to engage along their second camming ramp surfaces, and said rings to move toward each other axially by the camming action of said second camming ramp surfaces.

21. A connector mateable with another device comprising in combination:
 (a) an elongated, cylindrical core assembly having a front end and a back end;
 (b) a coupling ring mounted for rotation about the front end of said core assembly and resiliently biased against such rotation;
 (c) a contact element mounted on the front end of said core assembly;
 (d) keying means on said core assembly extending toward and beyond the front end of said coupling ring and configured to anti-rotationally interlock with corresponding keying means of said device when said device and said connector are engaged to be mated; and
 (e) a plurality of arcuate camming members at the front end of said coupling ring configured to engage and interlock with corresponding members of said device when said connector and said device are fully mated by twisting the coupling ring of said connector relative to its core assembly,
  (1) said contact element being slidably mounted on said core assembly and spring loaded so as to resiliently bias it against movement from a rest position to a retracted position toward the rear of said core assembly when said device and said connector are fully mated,
  (2) said connector including a spring biased alignment tube segment partially surrounding said contact and slidably mounted on said core assembly for linear movement relative to said contact element toward the rear of said core assembly against said bias.

22. The connector of claim 21 characterized further in that said connector includes:
 (a) an insert within said core assembly, said insert having an axially-extending bore, said alignment tube segment being mounted on the front end of said insert, and said contact element being slidably mounted in said axially extending bore;
 (b) first resilient means between said insert and said core assembly to bias said insert against movement toward the rear of said assembly; and
 (c) second resilient means between said contact element and said insert to bias said contact element against rearward movement within said insert.

23. The connector of claim 22 characterized further in that said first resilient means has a spring constant which exceeds the spring constant of said second resilient means.

24. The connector of claim 23 characterized further in that said first resilient means has an initial spring constant which is less than that of said second resilient means and an ultimate spring constant which is greater than that of said second resilient means.

25. The connector of claim 23 characterized further in that it includes a torque spring housed within said coupling ring and anchored at opposite ends between said coupling ring and said core assembly to bias said coupling ring against rotation around said core assembly.

26. The connector of claim 25 characterized further in that when said connector is fully mated with said device the core assembly of said connector is thrust toward said device under the urging of said torque spring with an axial force which is sufficient to at least partially compress both the first and the second resilient means of said connector.

27. A coupling mechanism mateable with a second coupling mechanism comprising in combination:
 (a) a cylindrical core assembly having front and rear portions;
 (b) a coupling ring mounted for rotation about the front portion of said core assembly;
 (c) means on said core assembly and said ring to stop rotation of said ring relative to said core assembly in a first direction;
 (d) means coupled between said coupling ring and said core assembly to resiliently bias said coupling ring against rotation relative to said core assembly in the opposite direction;
 (e) keying means on said core assembly extending beyond the front end of said coupling ring and configured to antirotationally interlock with corresponding keying means of said second coupling mechanism when said coupling mechanisms are engaged to be mated; and
 (f) a plurality of thread segments at the front end of said coupling ring,
  (1) each said thread segment having first and second camming ramp surfaces facing toward the front end and the rear end of said coupling ring, respectively,
  (2) the thread segments of a given one of said coupling mechanisms being configured so that when said coupling mechanism is engaged with its identical counterpart under a force linearly urging said coupling mechanisms toward each other and their keying means interlock, their first camming ramp surfaces abut and said linear force is translated thereby into a rotational force tending to turn each said ring in said first direction relative to its core against its stop means,
  (3) whereby engagement of said coupling mechanisms by linear force alone is prevented, and engagement of said coupling mechanism with its identical counterpart is made possible only by twisting at least one of said coupling rings in said opposite direction relative to its core against the force of said biasing means until the threads of one coupling ring clear the threads of the other coupling ring, at which point, under the urging of said linear force, the respective threads of said coupling rings move past each other axially so that, when said coupling ring is released, it is turned in said first direction by its biasing means, causing the threads of the respective coupling rings to engage along their second camming ramp surfaces, and said rings to move toward each other axially by the camming action of said second camming ramp surfaces.

28. The coupling mechanism of claim 27 characterized further in that said resilient biasing means is a helical spring housed in said coupling ring and anchored at one end in said coupling ring and at the opposite end in said core assembly.

29. The coupling mechanism of claim 28 characterized further in that said helical spring terminates at its opposite ends in a pair of radially-oriented tabs, and in that said coupling ring and said core assembly include axially-extending slots for receiving respective ones of said tab members.

30. A contact alignment system comprising in combination:
 (a) a pair of axially interfitting, mutually complementary alignment tube segments, which when interfitted constitute an alignment tube having a single longitudinal axis and each including a pair of axially spaced apart end walls at which said segments abut when they are interfitted; and
 (b) a pair of contact assemblies, each having a cylindrical alignment member slideably mounted within said approximately coaxially with a respective one of said tube segments, the inside diameter of each said tube segment being no greater than the outside diameter of the alignment member mounted within it,
 said tube segments, upon being axially interfitted, forcing said alignment members to move into mutual axial alignment along the longitudinal axis of said alignment tube.

31. The contact alignment system of claim 30 characterized further in that said end walls of said tube segments are slanted relative to the longitudinal axis of the alignment tube formed by said tube segments.

32. The contact alignment system of claim 30 characterized further in that each said tube segment comprises a root portion fully cylindrical in cross section and terminating in the first of said end walls, and an elongated tip portion extending beyond said first end wall, said tip portion being semi-cylindrical in cross section and terminating in the second of said end walls.

33. The contact alignment system of claim 30 characterized further in that said tube segments are identical.

34. The contact alignment system of claim 30 characterized further in that each said tube segment has a base integral with its root portion for mounting said tube segment.

35. The contact alignment system of claim 30 characterized further in that:
 (a) said tube segments are resilient and terminate in a tip portion semi-cylindrical in cross section;
 (b) each alignment member has an external diameter slightly larger than the internal diameter of its associated tube segment; and
 (c) upon said tube segments being axially interfitted, their tip portions deflect radially, and conform to the contours of their respective alignment members.

36. The contact alignment system of claim 35 characterized further in that each said tube segment comprises a root portion fully cylindrical in cross section and terminating in the first of said end walls, and an elongated tip portion semi-cylindrical in cross section extending beyond said first end wall and terminating in the second of said end walls.

37. The contact alignment system of claim 36 characterized further in that each of said end walls is slanted relative to the longitudinal axis of the alignment tube constituted of said tube segments.

38. The contact alignment system of claim 37 characterized further in that said tube segments are identical.

39. The contact alignment system of claim 38 characterized further in that each of said tube segments includes a base integral with said root portion for mounting said tube segment.

40. For use in aligning a cylindrical contact member having a given diameter with another cylindrical contact member on a common axis, the improvement comprising an alignment tube segment having a root portion terminating in a first end wall, and an elongated tip portion semicylindrical in cross section, extending beyond said first end wall and terminating in a second end wall, said tube segment being characterized in that:
 (a) two such tube segments interfit to form a single alignment tube,
 (b) said tube segment at least partially encloses said contact member, and
 (c) the inside diameter of said tube segment is no greater than the outside diameter of said contact member.

41. The alignment tube segment of claim 40 characterized further in that the walls of said tube segment are resilient.

42. The alignment tube segment of claim 40 characterized further in that said end walls are slanted relative to the longitudinal axis of said alignment tube segment.

43. The alignment tube segment of claim 42 characterized further in that its end walls lie in parallel planes.

44. The alignment tube segment of claim 43 characterized further in that the tip portion of said tube segment is greater in length than said root portion.

45. The alignment tube segment of claim 44 characterized further by a mounting base integral with the root portion of said tube segment.

46. A hermaphroditic connector comprising in combination:
 (a) a cylindrical core assembly;
 (b) a coupling ring mounted for rotation about the front end of said core assembly and resiliently biased against such rotation;
 (c) a contact element mounted on the front end of said core assembly;
 (d) keying means on said core assembly extending toward and beyond the front end of said coupling ring and configured to anti-rotationally interlock with the corresponding keying means of an identical connector when the two connectors are engaged to be mated; and
 (e) means at the front end of said coupling ring configured to engage and interlock with corresponding means of said identical connector when the two are fully mated by twisting the coupling ring of each relative to its respective core assembly,
  (1) said contact element being slidably mounted on said core assembly and spring loaded so as to resiliently bias it against movement from a rest position to a retracted position toward the rear of said core assembly when said identical connectors are fully mated,
  (2) said connector including a spring biased alignment tube segment partially surrounding said contact and slidably mounted on said core assembly for linear movement relative to said contact element toward the rear of said core assembly against said bias.

47. The connector of claim 46 characterized further in that said alignment tube segment has a root portion terminating in a first end wall and an elongated tip portion semi-cylindrical in cross section extending beyond said first end wall and terminating in a second end wall, said tube segment being characterized in that a pair of such tube segments interfit to form a single alignment tube.

48. The connector of claim 47 characterized further in that said end walls are slanted relative to the longitudinal axis of the alignment tube formed by said segments.

49. The connector of claim 47 characterized further in that the walls of said tube segment are resilient.

50. The connector of claim 49 characterized further in that the end walls of said alignment tube lie in parallel planes.

51. The connector of claim 50 characterized further in that the internal diameter of said alignment tube segment is smaller than the external diameter of the contact element which it partially surrounds.

52. The connector of claim 50 characterized further in that the tip portion of said tube segment is greater in length than said root portion.

53. The connector of claim 52 characterized further by a mounting base integral with the root portion of said tube segment.

54. The connector of claim 40 characterized further in that said alignment tube segment is configured to form a complete alignment tube with the corresponding alignment tube segment of said identical connector when the two connectors are fully mated.

55. The connector of claim 40 characterized further in that said connector includes:
   (a) an insert within said core assembly, said insert having an axially-extending bore, said alignment tube segment being mounted on the front end of said insert, and said contact being slidably mounted in said axially extending bore;
   (b) first resilient means between said insert and said core assembly to bias said insert against movement toward the rear of said assembly; and
   (c) second resilient means between said contact element and said insert to bias said contact element against rearward movement within said insert.

56. The connector of claim 55 characterized further in that said first resilient means has a spring constant which exceeds the spring constant of said second resilient means.

57. The connector of claim 52 characterized further in that said first resilient means has an initial spring constant which is less than that of said second resilient means and an ultimate spring constant which is greater than that of said second resilient means.

58. The connector of claim 52 characterized further in that it includes a helical torque spring housed within said coupling ring and anchored at opposite ends between said coupling ring and said core assembly to bias said coupling ring against rotation around said core assembly.

59. The connector of claim 58 characterized further in that when said connector is fully mated with its identical counterpart the core assemblies of the respective connectors are thrust toward each other under the urging of their respective helical torque springs with an axial force which is sufficient to at least partially compress the first resilient means of each of said connectors.

* * * * *